United States Patent [19]
Gogan et al.

[11] Patent Number: 4,945,212
[45] Date of Patent: Jul. 31, 1990

[54] THERMAL RADIATION DEVICE

[75] Inventors: James M. Gogan, Brick; Joseph Gialanella, N. Caldwell, both of N.J.

[73] Assignee: Savory Equipment, Inc., Lakewood, N.J.

[21] Appl. No.: 380,613

[22] Filed: Jul. 14, 1989

[51] Int. Cl.$^5$ .............................................. F27D 11/00
[52] U.S. Cl. ...................................... 219/388; 219/405
[58] Field of Search ................ 219/405, 411, 388, 347, 219/349

[56] References Cited

U.S. PATENT DOCUMENTS

| | | | |
|---|---|---|---|
| 3,193,663 | 7/1965 | Budzich | 219/405 |
| 3,240,915 | 3/1966 | Carter | 219/405 |
| 3,471,600 | 10/1969 | Meek | 219/388 |
| 3,660,585 | 5/1972 | Waldron | 219/405 |
| 4,286,509 | 9/1981 | Miller | 219/388 |
| 4,400,612 | 8/1983 | Lee | 219/388 |
| 4,629,865 | 12/1986 | Freedman | 219/405 |

Primary Examiner—Teresa J. Walberg
Attorney, Agent, or Firm—Howson and Howson

[57] ABSTRACT

A commercial-type toaster for toasting food articles such as sliced bread passed through a chamber on a moving grill. The chamber is heated by upper and lower thermal radiation elements above and below the grill. Arcuate reflectors adjacent to the elements redirect a portion of the radiant energy back to the elements for increasing the element temperature. Slots in the reflector associated with the lower element permit bread crumbs to fall through to a crumb tray below the grill.

7 Claims, 3 Drawing Sheets

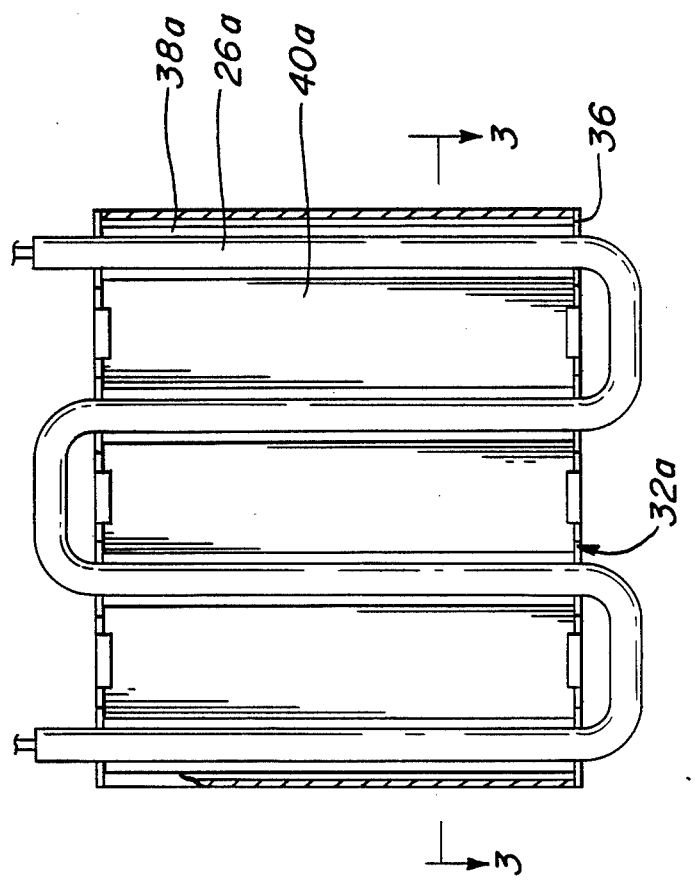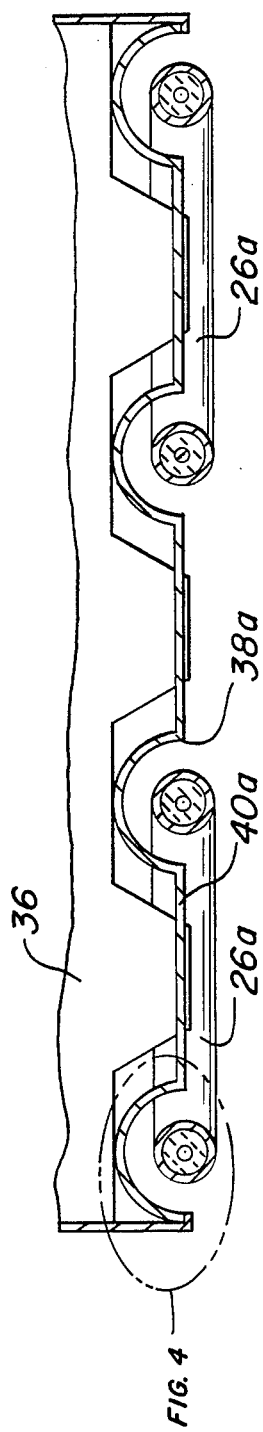

THERMAL RADIATION DEVICE

BACKGROUND OF THE INVENTION

The present invention relates generally to thermal radiators, and more particularly to an improved thermal radiation device suitable for use in electrical heating apparatus such as toasters and ovens.

Commercial-type toasters and baking ovens are often constructed with a moving grill or conveyor on which an article such as food or pottery is placed and passed through a large chamber between rods of continuously energized electric heating coils disposed over and under the conveyor. Their operation and maintenance expenditures are of continuing concern, especially with rising costs of energy and labor. The thermal (infrared) radiation efficiency is improved with metal reflectors spaced opposite of the far sides of the heating elements to reflect any outwardly radiating thermal energy toward the article thereby increasing the watt density (watts per square inch) or heat available at the surface of the article for the same rating. To increase heating effectiveness even further, prior art systems simply use heating elements of higher watt ratings. Reflectors located under the conveyor also become less effective because debris, such as bread crumbs, collect on the reflecting surfaces. Instead of reflecting the radiant energy, it is absorbed by the debris and conducted into the reflector and supporting structure. Consequently, it is periodically necessary to remove these reflectors for cleaning out accumulated debris, especially before they begin to smoke and burn as well as permanently mar the preferably bright finish of the reflector. In commercial heating apparatus, this entails costly production shutdowns and added labor for removing and cleaning or replacing the reflectors.

SUMMARY OF THE INVENTION

Accordingly, it is an object of the present invention to provide a unique thermal radiation device with improved radiating and heating efficiency, which is particularly suitable for commercial-type heating apparatus such as toasters and ovens.

Another object of the invention is to provide an energy-saving radiant heating device which increases the watt density of thermal radiation to the exposed area of an article for a given power input.

Still another object is to provide a heating device in which the temperature of a radiative emitter is increased for producing greater radiant energy output for a given energy input.

Yet another object of the invention is to provide a reflector, suitable for use under a thermal radiative element, which prevents debris from collecting on the reflecting surface and thereby reducing its efficiency.

A further object of the invention is to provide a reflector for a thermal radiation heating device which enables increased production for a given input of electrical energy.

A still further object is to provide a novel thermal radiation device which is inexpensive to manufacture and easy to clean or replace at nominal costs.

Briefly, these and other objects and aspects of the invention are accomplished with a contoured metal reflector juxtapositioned adjacent to a tubular thermal radiation element in a heating apparatus. The reflector is formed into a channel having a surface of arcuate cross section coaxially aligned with the element. Thermal energy radiated from the element toward the channel surface reflects radially back to the element increasing the element temperature. Thusly, for the same energy input, the element radiates more heat energy since the total radiant energy emitted per unit time from the element is proportional to the fourth power of the absolute temperature thereof. For a thermal radiation device in which the reflector is located below the element, a slot is formed along the bottom of the channel to permit debris, falling from any articles being processed above the element, to pass through thereby maintaining a clean thermal reflecting surface.

BRIEF DESCRIPTION OF THE DRAWINGS

For a better understanding of these objects, novel features and other aspects of the invention, reference is made to the following detailed description taken in conjunction with the accompanying drawings wherein:

FIG. 2 is a view of the upper thermal radiation device viewed in the direction of arrows 2—2 of FIG. 1;

FIG. 3 is a cross sectional view of the upper thermal radiation device taken along the line 3—3 of FIG. 2;

DESCRIPTION OF THE PREFERRED EMBODIMENT

Figure 1:
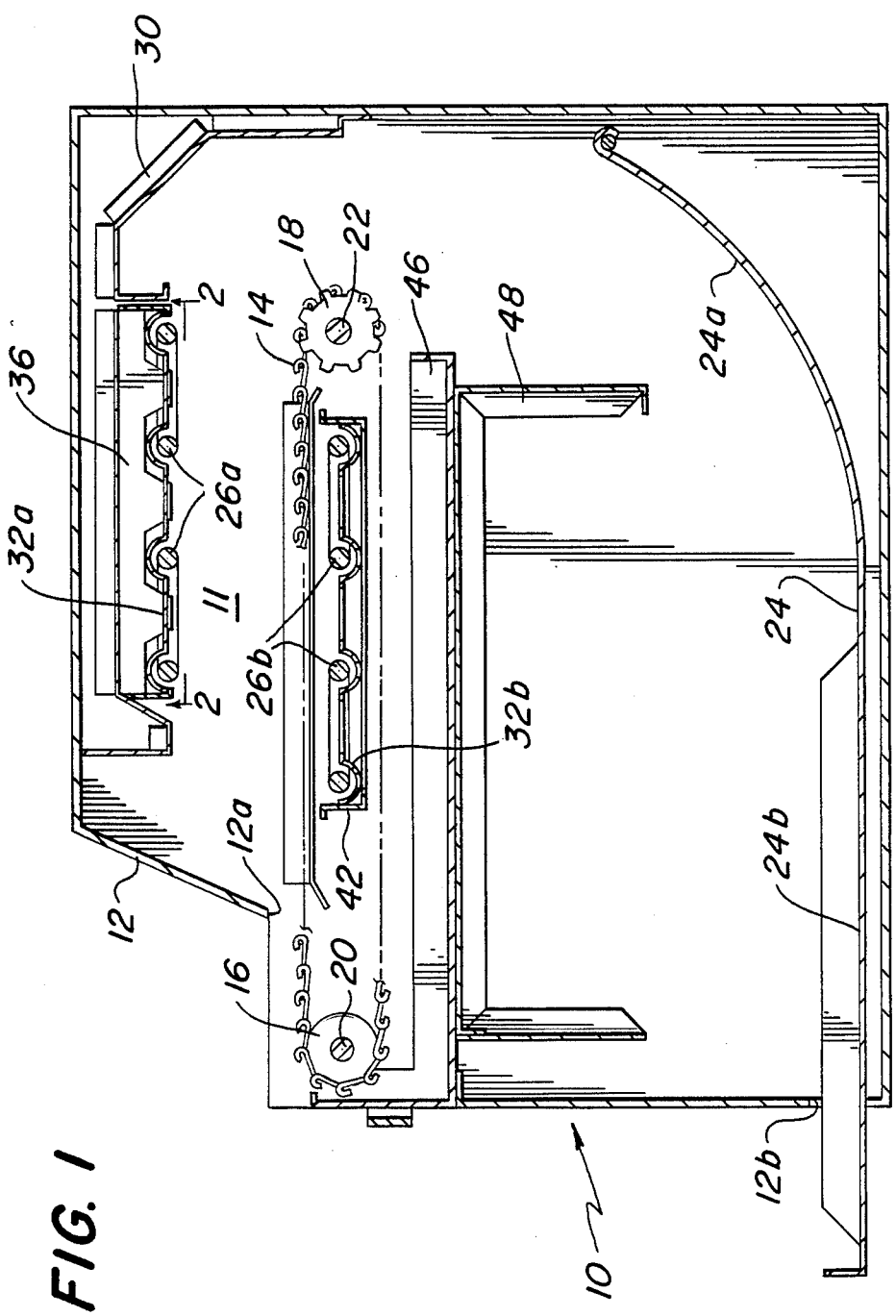
FIG. 1 is an elevation view in cross section of a toasting apparatus utilizing upper and lower thermal radiation devices according to the invention.

Referring now to the drawings wherein like characters designate like or corresponding parts throughout the several views, FIG. 1 shows a typical commercial-type toaster 10 suitable for heating, baking, drying or toasting food articles such as sliced bread, muffins, hamburger patties, and the like by radiant energy. Toaster 10 includes a chamber 11 formed in an housing 12 containing a generally horizontal continuous grill or conveyor 14 wrapped around a forward idler wheel 16 and rear drive sprocket 18 on respective shafts 20 and 22 rotatably supported across housing 12. Sprocket 18, driven by a motor not shown, moves the top side of conveyor 14 into housing 12 from a front inlet port 12a above conveyor 14 where the articles are placed for feeding into chamber 11. A chute 24 extending forwardly across the lower portion of housing 12 delivers the processed articles to a front outlet port 12b. Chute 24 includes an elevated ramp section 24a beneath sprocket 18 curving gradually into a horizontal section 24b and extending through port 12b. Thusly, processed articles falling off the rearward end of conveyor 14 at sprocket 18 slide along chute 24 with sufficient speed to discharge through port 12b.

Chamber 11 is heated by thermal radiation from upper and lower radioactive heating elements 26a and 26b, respectively, energized by an electrical source not shown. Upper element 26a is a conventional resistive rod, such as Calrod ® by General Electric Company, bent to form a series of parallel elongate segments oriented normal to the direction of travel of conveyor 14 and in a horizontal plane above the top of the articles a distance sufficient to impart the desired thermal (infrared) radiation. Lower element 26b, composed and constructed like element 26a, is positioned in a horizontal plane between wheel 16 and sprocket 18 below the upper span of conveyor 14, and preferably above the lower span, a distance sufficient to impart the desired thermal exposure to the bottom of the articles. Metal sheets 30 fixed across the upper rear section of housing 12 are provided for reflecting thermal radiation from the housing walls into chamber 11.

Figure 4:
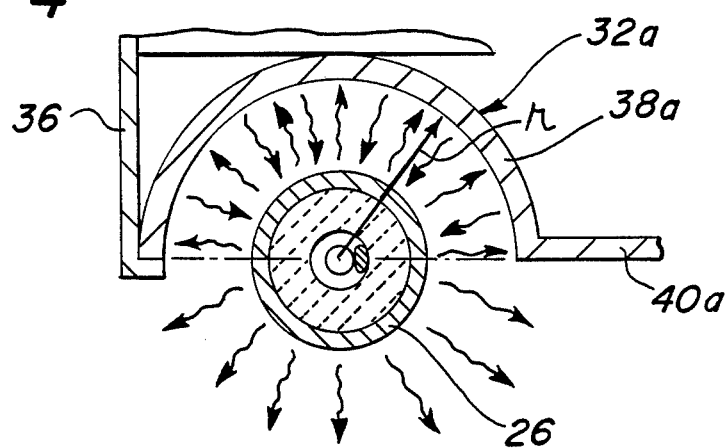
FIG. 4 is an enlarged fragmentary view in cross section of the upper thermal radiation device of FIG. 3.
Figure 5:
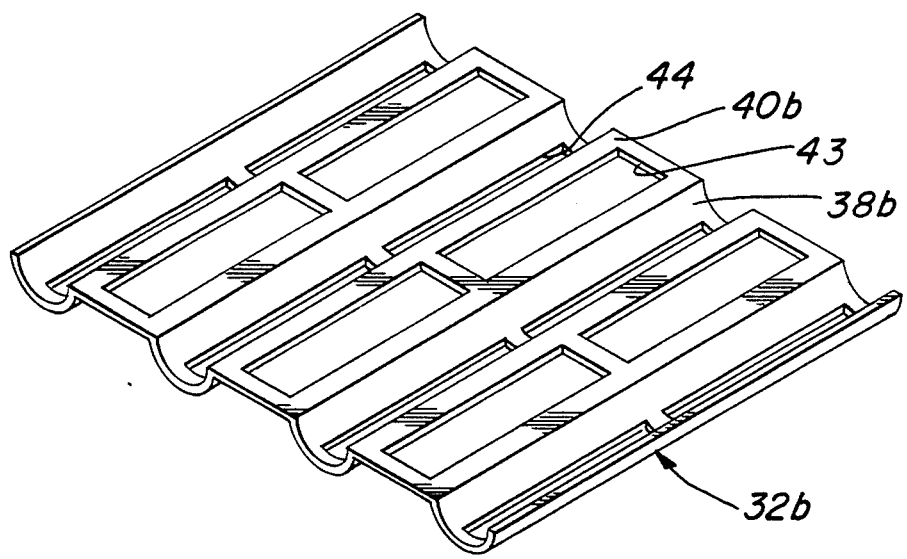
FIG. 5 is an isometric view of a reflector associated with the lower thermal radiation device of FIG. 1.

Upper and lower reflectors 32a and 32b are also provided for increasing the total radiant energy output of their associated elements 26a and 26b. As best illustrated in FIGS. 2 and 3, upper reflector 32a is removably supported above element 26a by brackets 36 extending from either side of housing 12. Each reflector 32a is constructed of metal sheet preferably with a bright surface facing element 26a. Reflector 32a is formed into parallel arcuate channels 38a of constant radius r and uniform cross section along the length thereof, coaxially aligned with respective ones of the elongate segments of element 26a, and joined together by flat sections 40a. With this arrangement, diagrammatically illustrated in FIG. 4, thermal radiation emitted by an element 26a in the direction away from conveyor 14 is radially redirected back onto itself by the surrounding arcuate reflecting surfaces of channels 38a thereby increasing rod temperature. According to the relation known as the Stefan-Boltzmann Law, the total amount of radiant energy emitted per unit area per unit time from any body is proportional to the fourth power of the absolute temperature of the body. Thus, for the same power input, element 26a radiates more heat energy at higher temperatures toward the article being processed. For example, a mere increase in temperature of element 26a from 1,000° F. to 1,100° F. will increase the rate of radiant energy output approximately 30%.

Lower reflector 32b is removably supported below element 26b by brackets 42 extending from either side of housing 12 and is formed like reflector 32a with arcuate channels 38b joined by flat sections 40b. Channels 38b are coaxial with the elongate segments of element 26b to radially redirect energy emitted by element 26b in the direction away from the conveyor 14 back onto itself for increasing the element temperature in the manner described for element 26a, thus achieving a greater radiant energy output for the same power input. Reflector 26b, however, further includes openings 43 in sections 40b and narrow slots 44 aligned in the bottom of channels 38b for preventing debris, such as bread crumbs, falling through conveyor 14, from collecting on, and degrading the efficiency of reflector 32b, thereby obviating periodic shutdowns of a production process for maintenance and cleaning of the reflector. A debris tray 46 slidably supported below conveyor 14 on brackets 48 extends from the sides of housing 12 and collects any debris falling through slots 44. Tray 44 may be periodically emptied by pulling it out the front of housing 12 without shutting down the process.

Some of the many advantages and novel features of the invention should now be readily apparent. For example, a thermal radiation device is provided in which the total radiant energy emitted is increased for a given power input. The device is particularly suitable for use in commercial-type toasters and ovens in which food is processed on a conveyor. Debris such as crumbs falling from bread slices during toasting, does not degrade operation and require frequent shutdowns. Consequently, increased production for a given energy level or less electrical energy for the same production level is possible.

It will be understood that various changes and details, steps and arrangement of parts, which have been herein described and illustrated in order to explain the nature of the invention, may be made by those skilled in the art within the principle and scope of the invention as expressed in the appended claims.

I claim:

1. A thermal radiation device comprising, in combination:
    cylindrical rod means for radiating thermal energy;
    elongate channel means having in cross section a semicircular concave reflecting surface of constant radius, said surface being coaxially juxtapositioned along the length of said rod means for redirecting substantially all of the energy radiated to said surface back to said rod means for increasing the temperature of said rod means;
    whereby the rate of the nonreflected emitted by said rod means is increased.

2. A thermal radiation device according to claim 1 wherein:
    said rod means further comprises a tubular electrical resistive element;

3. A thermal radiation means according to claim 1 further comprising:
    said channel means includes a slot along the length thereof for preventing debris from collecting on the arcuate surface.

4. A thermal radiation device comprising, in combination:
    rod means formed into a series of elongate parallel segments for radiating thermal energy;
    elongate channel means having in cross section semicircular concave reflecting surfaces of constant radius and parallel to said rod means, said surfaces being coaxially juxtapositioned along the length of respective ones of said segments for redirecting substantially all of the energy radiated to said surface back to said segments for increasing the temperature of said segments;
    whereby the rate of the nonreflected energy emitted by said rod means is increased.

5. A thermal radiation device according to claim 4 wherein:
    said channel means includes a slot in respective ones of said arcuate surfaces for preventing debris from collecting thereon.

6. Heating apparatus for processing an article such as food and pottery, comprising, in combination:
    a housing forming a chamber;
    a conveyor operatively connected in said housing for transporting the article through the chamber;
    upper and lower rod means respectively disposed above and below said conveyor for producing thermal radiation and directing the radiation to the article transported through the chamber; and
    elongate upper and lower reflector means, each having in cross section a concave reflecting surface of constant radius along the length thereof, said upper and lower reflector means being coaxially juxtapositioned respectively above and below said upper and lower rod means for reflecting all of the energy radiated to said surfaces back to said upper and lower rod means for increasing the temperature of said rod means.

7. Heating apparatus according to claim 6 wherein:
    said lower reflector means includes slot means for preventing accumulation of any debris falling from the article transported therethrough.

* * * * *

UNITED STATES PATENT AND TRADEMARK OFFICE
CERTIFICATE OF CORRECTION

PATENT NO. : 4,945,212
DATED : July 31, 1990
INVENTOR(S) : James M. Gogan

It is certified that error appears in the above-identified patent and that said Letters Patent is hereby corrected as shown below:

Column 4, line 17, insert --energy-- after "nonreflected"

Signed and Sealed this

Twenty-fourth Day of September, 1991

Attest:

HARRY F. MANBECK, JR.

Attesting Officer

Commissioner of Patents and Trademarks